C. O. ANDERSON.
AUTOMATIC SLACK ADJUSTER.
APPLICATION FILED APR. 18, 1907.

922,552.

Patented May 25, 1909.
3 SHEETS—SHEET 2.

Witnesses:
Inventor:
Charles O. Anderson
By Hill & Hill
Attys

C. O. ANDERSON.
AUTOMATIC SLACK ADJUSTER.
APPLICATION FILED APR. 18, 1907.
922,552.
Patented May 25, 1909.
3 SHEETS—SHEET 3.
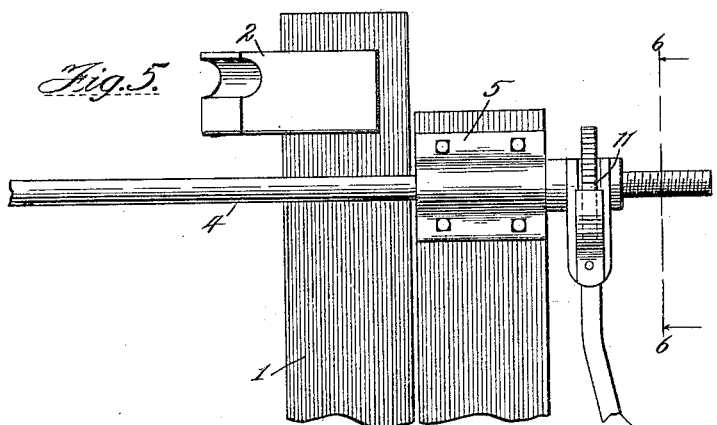
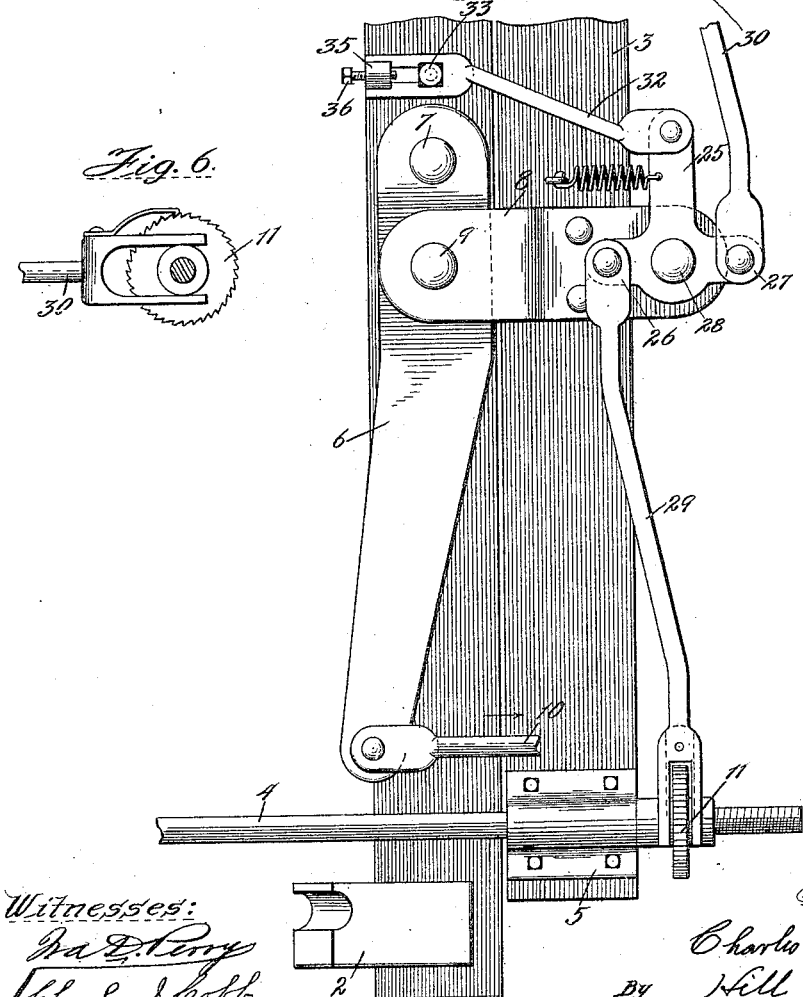
Witnesses:
Ira D. Perry
Charles J. Cobb
Inventor:
Charles O. Anderson
By Hill & Hill
Attys

UNITED STATES PATENT OFFICE.

CHARLES O. ANDERSON, OF OMAHA, NEBRASKA, ASSIGNOR TO A. T. AUSTIN, OF OMAHA, NEBRASKA.

AUTOMATIC SLACK-ADJUSTER.

No. 922,552.      Specification of Letters Patent.      Patented May 25, 1909.

Application filed April 18, 1907. Serial No. 368,865.

*To all whom it may concern:*

Be it known that I, CHARLES O. ANDERSON, a citizen of the United States, residing at Omaha, county of Douglas, and State of Nebraska, have invented certain new and useful Improvements in Automatic Slack-Adjusters, of which the following is a description.

My invention relates to means for taking up the slack, or adjusting the coöperating members of a brake mechanism to compensate for wear or the distortion of the parts incident to practical operation.

The object of my invention is to provide a simple, efficient, and durable device of the kind described, and one requiring very little or no attention except when it is necessary to renew the brake shoes.

To this end my invention consists in the novel construction, arrangement, and combination of parts herein shown and described and more particularly pointed out in the claims.

Figure 1:
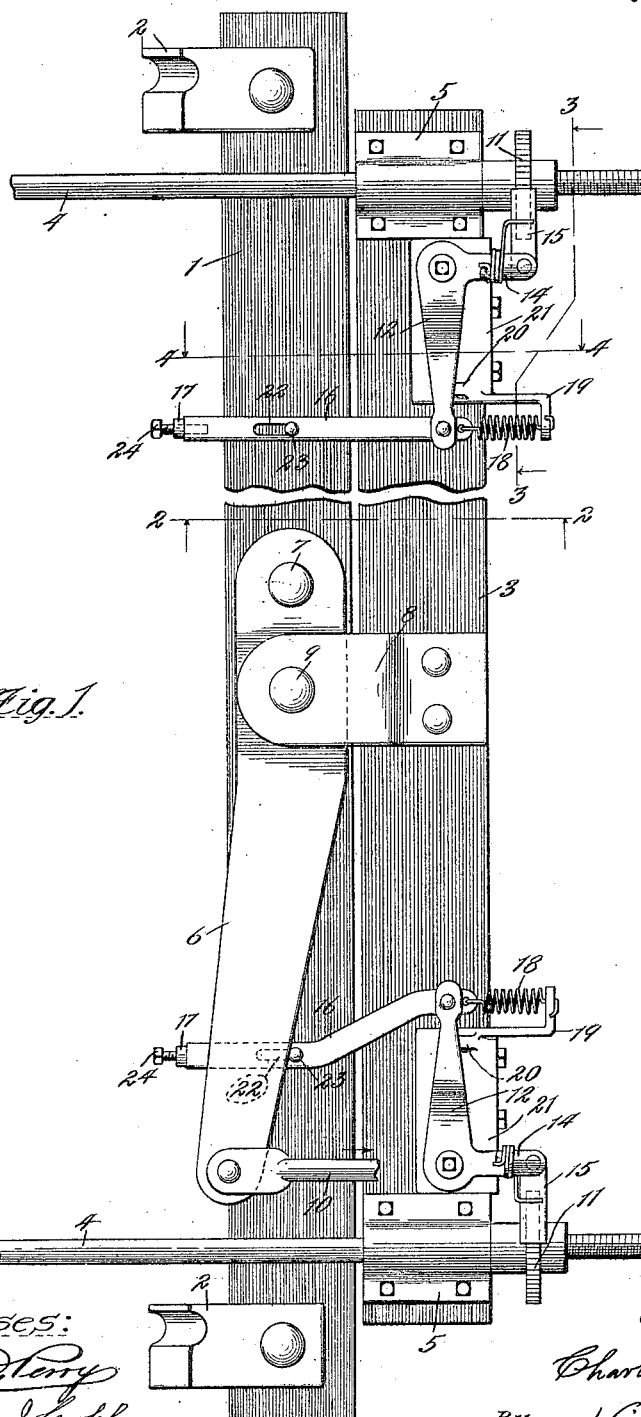
Figure 2:
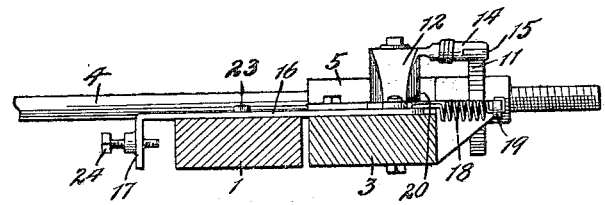
Figure 3:
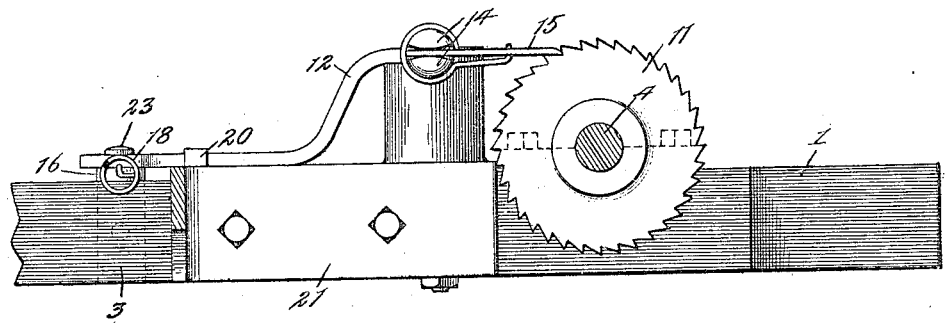
Figure 4:
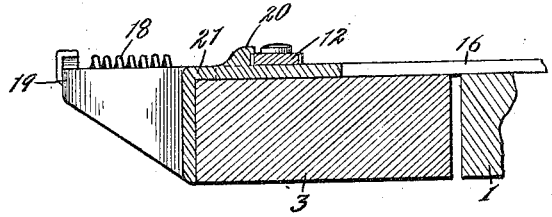

In the accompanying drawing, wherein like or similar reference characters indicate like or corresponding parts; Figure 1 is a plan view of a portion of a brake mechanism equipped with my device. Fig. 2 is a section taken substantially on line 2—2 of Fig. 1. Fig. 3 is a section taken substantially on line 3—3 of Fig. 1. Fig. 4 is a section taken substantially on line 4—4 of Fig. 1. Fig. 5 is a plan view similar to that shown in Fig. 1 but showing a slightly modified form of my device; and Fig. 6 is a section taken substantially on line 6—6 of Fig. 5.

In the drawings my device is shown upon a simple form of brake mechanism especially suitable for street-cars or similar vehicles upon which the brake may be operated either by hand or power as desired.

As shown 1 is the brake beam to the ends of which the brake shoes 2—2 are attached, a second beam 3 is provided substantially parallel to, and in the same plane as, the brake beam 1, and connected to a similar brake beam, or to a pair of beams arranged substantially similar to those shown in the drawings, by means of the rods 4—4 positioned in suitable bearings 5—5 at opposite ends of the beam 3.

Any suitable means may be employed to operate the brakes, the most obvious and simple method being to separate the beams 1 and 3, thus positively forcing the shoes 2—2 against the wheels at one end of the truck and through the instrumentality of the rods 4—4 drawing the brake beam with its attached shoes (not shown) against the wheels at the opposite end of the truck. Any suitable mechanism may be employed for this purpose. In the form shown an operating lever 6 is pivotally mounted upon the beam 1 at 7, and a clevis 8 also pivotally attached to the lever 6 is rigidly connected to the beam 3 as clearly shown in Fig. 1. A rod 10 or other suitable means is attached to the free end of the operating lever 6 to move the same in the direction indicated by the arrow to operate the brake by the usual or any preferred brake operating mechanism (not shown), the parts being moved in the opposite direction by the usual release springs or other means commonly employed in this form of brakes (not shown). As usually constructed brakes of this type are adjusted to take up the slack by means of turn-buckles or equivalent devices provided at any desired point upon the rods 4—4 to adjust their operative length, and operated by hand to compensate for the wear when the slack in the brake mechanism becomes excessive. In the form shown in the drawings however the extremities of the rods 4—4 are threaded and a threaded ratchet wheel 11 is provided upon each rod adapted to serve the purpose of a nut. A bell crank lever 12—14 or equivalent means is provided for each rod 4 and a pawl 15 is mounted near the free end of the arm 14 of each bell crank to coöperate with the teeth of its particular ratchet 11 to rotate the same to adjust the operative length of the rod 4.

Any suitable means may be provided to oscillate the bell cranks 12—14 to rotate the ratchet 11 when the relative movement between the beams 1 and 3 becomes excessive and to avoid such operation when the movement between the beams is normal. In the form shown an adjusting rod 16 is connected to the extremity of the arm 12 of each bell crank, with a part 17 positioned in the path of the beam 1 and arranged to be engaged thereby and rock the bell crank when the movement between the beams is excessive. A spring 18 is provided extending from a bracket 19 or other suitable part upon the beam to the rod 16 to normally draw the part 17 toward the beam 1, a stop 20 being provided to limit the movement of the parts in this direction.

The parts may be attached to the beams 1 and 3 in any desired manner. In the form shown an angle plate 21 is mounted upon the beam 3 and the bell crank 12—14, bracket 19, and stop 20, are severally mounted upon this angle plate as shown, obviously however if preferred the angle plates 21 may be made a portion of the bearing 5 thus preventing the possibility of any lost motion other than that due to wear between the rods 4 and the adjusting mechanism.

Any suitable means may be provided to retain the adjusting rod 16 in position. As shown a slot 22 is provided in the rod 16 and a suitably formed screw 23 or other suitable means passes through the slot and into the beam 1, thus preventing lateral movement of the adjusting rod 16 and providing for the movement between the beams 1 and 3. An adjusting screw 24, is also preferably provided in the part 17 adapted to engage the beam 1 to adjust the operation of the adjusting mechanism to any desired relative movement between the beams 1 and 3. In this form the mechanism for adjusting the operative length of the two rods 4—4 are substantially the same except that one of the rods 4 and its ratchet wheel 11 is provided with a left hand thread while a right hand thread is formed upon the other rod and wheel, also to avoid interference with the operating lever 6 one of the operating rods 16 is offset as shown.

In the form shown in Figs. 5 and 6 the brake mechanism is substantially the same in all respects to that hereinbefore described, also the rods 4—4, and the ratchets 11—11 except that in this case if preferred both rods may be threaded either right or left hand as convenient. In this form a projection is provided upon the beam 3, a T-lever 25, 26, 27 is pivotally mounted upon the projection as at 28 and a pair of rods 29 and 30 are pivotally attached respectively to the arms 26 and 27 of the T-lever. The free ends of the rods 29 and 30 extend to the ratchet wheels 11—11 and are preferably forked both vertically and horizontally to engage the hub of the ratchet wheel, upon opposite sides of the wheel. A suitable pawl 31 is provided upon each of the rods so arranged that by oscillating the arm 25 of the T-lever the ratchets 11—11 will be simultaneously rotated upon the rods 4—4 to reduce their operative length.

As shown a slotted bar 32 is pivotally attached to the arm 25 of the T-lever and a screw 33 extends through the slot in the bar 32 into the beam 1 thus guiding that end of the bar 32. In this form instead of the bar 32 directly engaging the beam 1 as in the form hereinbefore described a boss 35 is provided at one end of the slot, and a screw 36 is fitted in the boss, in position to engage the head of the screw 33 in the beam, thus providing adjustable means for operating the T-lever by the relative movement of the beams 1 and 3 substantially as before described.

The operation of the device is believed to be clearly described in the foregoing explanation of the mechanism, and no further description is believed to be required.

Having thus described my improvement it is obvious that various immaterial modifications may be made in my device without departing from the spirit of my invention, hence I do not wish to be understood as limiting myself to the exact form and construction shown.

What I claim as new, and desire to secure by Letters Patent is:—

1. In a device of the kind described, a pair of beams forming a part of a brake mechanism and adapted to be separated to operate the brakes, in combination with means adapted to be operated directly by the relative movement of said beams to adjust said brake mechanism to maintain said beams in their normal relation to each other.

2. In a device of the kind described, a pair of substantially parallel beams forming a part of a brake mechanism, and adapted to be separated to operate said brakes, in combination with adjustable means for connecting said beams to other portions of said brake mechanism and means adapted to be operated by the relative movement of said beams to adjust said connecting means to maintain said beams in their normal relation to one another.

3. In a device of the kind described, a pair of substantially parallel pivotally connected beams forming part of a brake mechanism and adapted to be separated to operate the brakes, in combination with means adapted to be operated by the relative movement of said beams to adjust said brake mechanism to maintain said beams in their normal relation to one another.

4. In a device of the kind described, a pair of beams forming a part of a brake mechanism and adapted to be separated to operate the brakes, and a brake operating lever pivotally connecting said beams, in combination with means independent of said operating mechanism adapted to be operated by the relative movement of said beams to adjust the operative movement of said lever.

5. In a device of the kind described, a pair of substantially parallel beams forming a part of a brake mechanism and adapted to be separated to operate the brakes, and a brake operating lever pivotally connecting said beams, in combination with adjustable means for connecting said beams to other portions of said brake mechanism and means adapted to be operated by the relative movement of said beams to adjust said connecting means to control the operative movement of said lever.

6. In a device of the kind described, a pair of beams forming a part of a brake mechanism and adapted to be separated to operate the brakes, a rod connecting said beams to other parts of the brake mechanism, and adjusting means arranged to control the operative length of said rod, in combination with means adapted to be operated by the relative movement of said beams for operating said adjusting means.

7. In a device of the kind described, a pair of beams forming a part of a brake mechanism, and adapted to be separated to operate the brakes, a plurality of rods connecting said beams to other parts of the brake mechanism, and adjusting means arranged to control the length of each rod, in combination with means adapted to be operated by the relative movement of said beams to simultaneously operate said adjusting means.

8. In a device of the kind described, a pair of substantially parallel pivotally connected beams forming a part of a brake mechanism, and adapted to be separated to operate the brakes, a plurality of substantially parallel rods connecting said beams to other parts of the brake mechanism, and adjusting means arranged to control the length of each rod, in combination with means adapted to be operated by the relative movement of said beams to simultaneously operate said adjusting means.

9. In a device of the kind described, a pair of beams forming a part of a brake mechanism and adapted to be separated to operate the brakes, a threaded rod connecting one of said beams to other parts of the brake mechanism, and a threaded ratchet wheel rotatably mounted upon said rod and engaging the threads thereof, in combination with means adapted to be operated by the movement between said beams for rotating said ratchet wheel to adjust the operative length of said rod.

10. In a device of the kind described, a pair of substantially parallel pivotally connected beams forming a part of a brake mechanism and adapted to be separated to operate the brakes, a threaded rod connecting said beams to other parts of the brake mechanism, and a threaded ratchet wheel rotatably mounted upon said rod and engaging the threads thereof, in combination with means adapted to be operated by the movement between said beams for rotating said ratchet wheel to adjust the operative length of said rod.

11. In a device of the kind described, a pair of beams forming a part of a brake mechanism and adapted to be separated to operate the brakes, a brake operating lever pivotally connecting said beams, a threaded rod connecting said beams to other parts of the brake mechanism, and a threaded ratchet wheel rotatably mounted upon said rod and engaging the threads thereof, in combination with means adapted to be operated by the movement between said beams for rotating said ratchet wheel to adjust the operative length of said rod.

12. In a device of the kind described, a pair of beams forming a part of a brake mechanism and adapted to be separated to operate the brakes a plurality of threaded rods connecting one of said beams to other portions of the brake mechanism, and a threaded ratchet wheel rotatably mounted upon each rod and engaging the threads thereof, in combination with means adapted to be operated by the movement between said beams for simultaneously rotating said ratchet wheels to adjust the operative length of said rods.

13. In a device of the kind described, a pair of beams forming a part of a brake mechanism and adapted to be separated to operate the brakes, in combination with means for separating said beams to operate the brakes, and independent means adapted to be operated by the relative movement of said beams to adjust said brake mechanism to maintain said beams in their normal relation to one another.

14. In a device of the kind described, a pair of beams forming a part of a brake mechanism and adapted to be separated to operate the brakes, in combination with means fixedly connected to both beams for separating said beams to operate the brakes, and independent means adapted to be operated by the relative movement of said beams to adjust said brake mechanism to maintain said beams in their normal relation to one another.

In testimony whereof, I have hereunto signed my name in the presence of two subscribing witnesses.

CHARLES O. ANDERSON.

Witnesses:
BURTON U. HILLS,
CHARLES I. COBB.